United States Patent [19]

Shackelford

[11] 3,789,728

[45] Feb. 5, 1974

[54] BLIND FASTENER

[75] Inventor: James R. Shackelford, Cuyahoga Falls, Ohio

[73] Assignee: The B. F. Goodrich Company, New York, N.Y.

[22] Filed: July 25, 1972

[21] Appl. No.: 274,853

Related U.S. Application Data

[63] Continuation-in-part of Ser. No. 95,824, Dec. 7, 1970, abandoned.

[52] U.S. Cl. .............................................. 85/71
[51] Int. Cl. ......................................... F16b 13/04
[58] Field of Search ........... 85/70, 71; 285/208, 210; 287/20.3; 29/522

[56] References Cited
UNITED STATES PATENTS

| | | | |
|---|---|---|---|
| 3,174,387 | 3/1965 | Fischer | 85/71 |
| 2,341,598 | 2/1944 | Crowley | 85/71 |
| 2,763,314 | 9/1956 | Gill | 85/70 |
| 3,178,989 | 4/1965 | Siebol | 85/71 |
| 3,461,771 | 8/1969 | Briles | 85/70 |
| 3,667,340 | 4/1970 | Black et al. | 85/71 |

FOREIGN PATENTS OR APPLICATIONS

| | | | |
|---|---|---|---|
| 608,218 | 9/1948 | Great Britain | 85/71 |

*Primary Examiner*—Edward C. Allen
*Attorney, Agent, or Firm*—W. A. Shira, Jr.; Harold S. Meyer

[57] ABSTRACT

A one-piece blind fastener, of the kind which serves as a nut plate, has a head to bear against the exposed face of a structural member having a hole in it, and a cylindrical hollow body to pass through the hole and expand in a flower petal shape against the blind face of the structural member when shortened by pulling up a threaded draw rod. The head and the internally threaded far end are circumferentially continuous, and are integral with the body. The intermediate portion of the body which protrudes through the hole is longitudinally divided into strips and has an internal shallow step or offset about midway of its length.

5 Claims, 9 Drawing Figures

PATENTED FEB 5 1974 3,789,728

BLIND FASTENER

CROSS REFERENCE

This application is a continuation in part of my application for U.S. Pat. Ser. No. 95,824 filed Dec. 7, 1970 and now abandoned.

BACKGROUND

This invention relates to blind fasteners, which means fasteners which can be installed entirely from one side of a structure, and preferably the type having an internal screw thread so that they can be used to fasten a separate component of a product to a structure by means of screws. Such blind fasteners are extensively used where it is not convenient or practical to drill and tap the structure to receive a screw.

Heretofore, various designs of blind fasteners have been proposed consisting of threaded tubular bodies which can be inserted through a hole in a structure and expanded to bear against the back or blind surface of the structure so that the threaded portion will function as a nut plate for fastening the desired external component.

In one form of such prior devices, a tubular wall of substantial thickness is provided for adequate strength. Such a device can be expanded against the back surface of the structure through which the device is applied by various means, as by simply increasing the diameter of the end by drawing in a conical wedge, or by shortening the entire device to cause upsetting for localized bulging of the middle portion of the length of the device. The increase in diameter of the expanded portion of all such devices is limited. Consequently, they are rather easily pulled through the structure in which they are installed, since such devices are usually installed only where the thinness of the structure or the nature of its material result in a strength which is inadequate for tapping the structure for direct reception of a screw and therefore also inadequate for resistance against a strong pull on a fastener whose diameter is only slightly greater than that of the hole in which it is placed.

In another form of such prior devices, a tubular shank is longitudinally slit or slotted over part of its length, so that the strips of metal between the longitudinal slits or slots can be caused to fold outwardly by shortening the shank, and present a flower petal shape pressing against the blind surface of the structure. Such slit shank fasteners are often made of thin sheet metal which will support only moderate loads. Experience with them is that the strips tend to fold inwardly in some instances, with resultant crumpling instead of smooth folding; and to fold in different locations in different strips of the same fastener, with resultant failure of the strips to bear equally against the structure. These faults have been overcome by notching or internal grooving of the strips, which adds to expense of manufacture, or by starting to bend the strips before installation, which requires provision of clearance, and both of which significantly weaken the fastener.

An object of this invention accordingly is to provide a simple, inexpensive blind fastener which can be used as a nut plate and which has maximum strength against pulling out of the hole in which it is installed.

SUMMARY OF THE INVENTION

This invention in its preferred embodiment is an integral seamless blind fastener, which can be installed from one side only of a hole in a structure and be expanded to grip the blind surface, and which combines for the first time a heavy thickness of fastener wall with uniform bearing of a large area of contact on the blind surface of the structure, so that, when used for fastening of an external component to the structure by means of a screw, the assembled fastener will easily resist pulls of many hundreds or thousands of pounds without either failure of the fastener or failure of the structure in which it is installed.

This fastener has a head attached to a heavy walled hollow body, which is preferably of uniform external diameter for maximum strength. The end of the hollow body most distant from the head is ordinarily internally threaded for reception of a threaded draw rod for installation and for subsequent reception of the screw or bolt for which it is intended. The portion of the body which projects on the blind side of the structure but short of the threaded portion is at least approximately as long as its diameter, and is longitudinally slit through to the bore or is deeply grooved just short of cutting clear through, so as to subdivide its circumference into longitudinal strips. In addition, the bore is made of a nonuniform diameter largest at the head end, and with a step or offset in diameter about midway of the length of the bore.

When suitable tension is applied by means of a threaded draw rod, the longitudinal strips bend outwards and produce a tight fold pressing firmly against the back surface of the structure in a flower petal shape with an area of contact many times greater than can be obtained by merely bulging the walls. Tests have shown that when external components are held by screws to these fasteners, the fasteners will resist far greater forces than can be sustained by the previously known blind fasteners.

DRAWINGS

In the accompanying drawings.

DESCRIPTION

Figure 1:
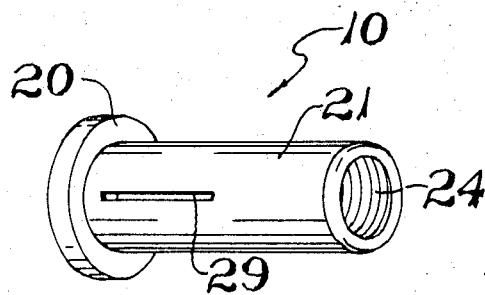
FIG. 1 is a perspective view of one form of the fastener of this invention.
Figure 2:
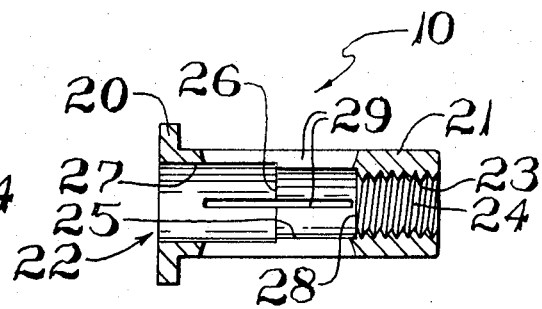
FIG. 2 is a longitudinal section.

Referring to FIG. 1, a typical form of the fastener 10 of this invention, intended to serve as a nut plate for a screw to hold an external component to a sheet metal or other similar structure 11, can be made from any ductile metal in any needed size and strength by machining from bar stock or by equivalent procedures. The fastener 10 has a head 20 and a shank or hollow body 21 of uniform external diameter, and a length preferably considerably over twice its diameter. The bore 22 is of stepped diameter with the smallest diameter 23 at the end farthest from the head where it is tapped to produce threads 24 for reception of the draw rod and later of the fastening screw. The portion of the bore adjacent to the threaded far end is formed with an intermediate diameter 25 with a very shallow step 26 or offset connecting it with the portion of greatest diameter for the remainder of its length 27 including the part of the bore through the head 20. The step 26 should be located at about the mid-point of the part of the length between the blind surface 12 of the structure 11 through which it is to be installed and the location of the first thread 28 as will be explained below. This same portion from about the position of the blind surface 12 of the structure 11 to the location of the first thread 28 is divided into longitudinal strips 30 by a plurality of slits 29.

This fastener 10 is installed by screwing it on to the tip of a high strength threaded draw rod (not shown) and is inserted through a hole 13 which it will fit easily, in a structure 11 of sheet metal or other material of limited thickness, with the head 20 bearing against the visible face 14. Many machines, both manually and power-actuated, are available for installation of blind fasteners by applying tension to a suitable draw rod against the reaction of an annular anvil in contact with the head of the fastener.

Figure 3:
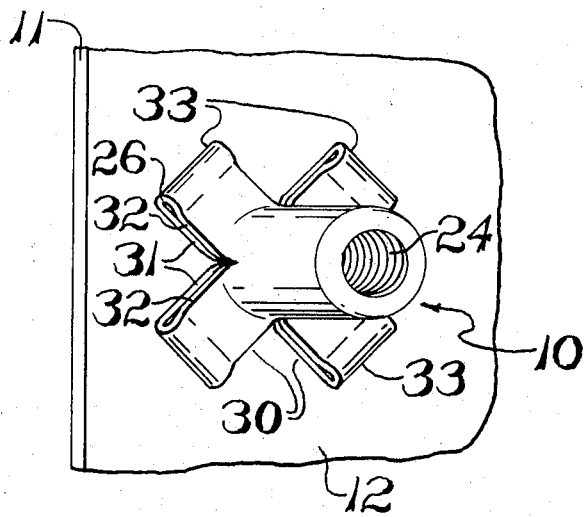
FIG. 3 is a perspective view of the fastener as installed.
Figure 4:
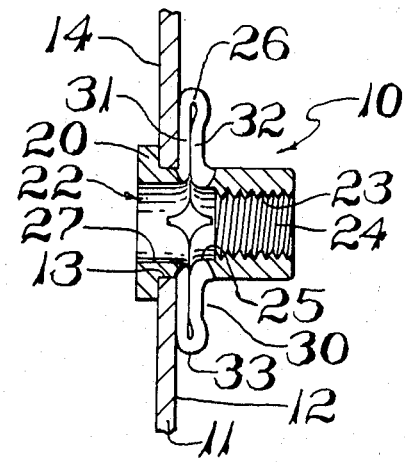
FIG. 4 is a sectional view of the same installation.

When tension is applied to the draw rod in the usual manner, the longitudinal pressure in the direction of the head at the location of the step 26 will be centered at about the mid-point of the thickness of the wall in the portion of reduced thickness. On the other hand, the pressure in the portion of slightly greater thickness on the other side of the step 26 will be centered at about the mid-point of its thickness which will cause the pressure to have an outward component of direction. The result is that each of the longitudinal strips will be caused to fold outwardly in the location of the step 26. As the shortening of the device continues, each strip 30 will bend until the half 31 of the length of the strip closest to the head is applied firmly against the blind surface 12 of the structure through which it is installed. When the folding of the strips 30 is completed, the other half 32 of each strip will be bent at 180° to the half closest to the head, forming a tight fold 33 at about the location of the step 26 in a shape resembling a flower petal, as shown in FIGS. 3 and 4. The greater thickness of the back half 32 of each strip as compared to the half 31 closest to the head causes the folding action to press the outermost portion of each "petal", the fold 33, strongly against the blind surface 12 of the structure through which the fastener is installed. The draw rod is then screwed out of the fastener 10, which is ready to use for holding any desired component to the structure 11 in which it is installed.

This kind of fastener is particularly useful in installing hardware on sheet metal structures such as vehicles, household appliances and the like. For example, in installing seat belts for the passengers of automobiles or aircraft, it is found that use of these new fasteners as nut plates to receive the screws so greatly increases the area of support and therefore the strength as to permit elimination in many situations of outsize washers or other back-up plates, so that the installation can be made in ordinary unreinforced floor panels.

The very high strength of these new fasteners appears to be based on a number of factors. The first is that the entire fastener is an integral unit made from a single piece of metal. The next is that the walls of the hollow body are thick in proportion to diameter, preferably of the order of 8 to 10 percent or more of the outer diameter of the body. Another is that the portions which form the flower petal folds have a substantial length before installation, at least approximately as long as the diameter of the body itself, which means that the radial length of the "petals" is at least about half the diameter of the cylindrical body. Finally, both ends, both the head and the threaded end, are circumferentially continuous and circumferentially strong and rigid.

These factors are important because the strength of the screw in the fastener is dependent on the combination of rigidity and bearing area of the "petals" on the blind surface of the structure through which the fastener is installed. Rigidity results from the heavy wall, tight 180° fold, and support of the folded metal by stiff rings on both sides, namely by the annular head and by the annular threaded end, causing strong resistance to any further deformation and weakening of the fastening in service. Also, the fastener is supported against the blind face 12 of the structure at the very tips of the "petals" by the smoothly rounded folds 33 at a substantial distance from the hole 13 in the structure 11. The large bearing area of a plurality of wide and long rounded rigid petals in contact with the blind surface at a substantial distance from the hole distributes the load so widely as to minimize any possibility of tearing the structure in which the fastener is mounted and practically to eliminate failure by stretching of the opening in the structure.

Instead of subdividing the body of the device by longitudinally slitting clear through the wall of the body, it is sometimes preferred to subdivide the metal by deeply scoring it with grooves which extend almost but not quite through the metal.

Figure 5:
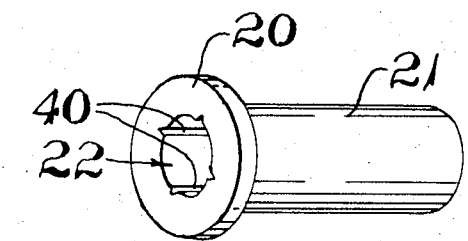
FIG. 5 through FIG. 9 show alternative forms of the invention, in perspective and in section.

Thus, referring to FIG. 5, internal longitudinal grooves can be formed by an externally ribbed punch or mandrel in the bore 22 from the head in, up to the threaded portion, to form grooves 40 which extend most of the way through the wall of the body. If the remaining metal at the location of the grooves 40 is sufficiently thin, the shortening of the device by tension on the draw rod produces separation of the strips by opening up of the grooves, with subsequent folding in exactly the same manner and with the same results as already described in connection with FIGS. 1 through 4. Even though the grooves extend through the head portion of the bore, they do not affect the rigidity and circumferential continuity of the head portion either before or after installation, because the grooves do not extend into the flange of the head.

Figure 6:
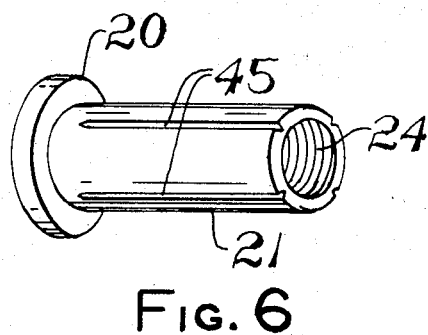

Referring to FIG. 6, the subdivision of the body 21 into longitudinal strips may be accomplished by forming external grooves 45, as by use of an internally ribbed female die. Again, if the remaining metal at the base of the grooves is sufficiently thin, the strips will separate and fold as described above and as shown in FIGS. 3 and 4. In this method of manufacture, when the external grooves extend completely to the end of the body as shown in FIG. 6, care must be taken that the external diameter of the threads 24 is small enough to leave sufficient continuous metal around the circumference of the threaded portion of the body to maintain rigidity and avoid any splitting of the threaded portion during installation or subsequent use.

In every case, development of maximum strength of the fastener requires that the strips 30 be capable of folding outwardly at the back edge of the hole 13. Consequently, the slits 29 or grooves 40 or 45 should either extend completely up to (or through) the head 20, or be spaced no further from the head than the thickness of the thinnest structure through which the fastener 10 is intended to be installed. In the other direction, the slits 29 or grooves 40 or 45 in the unthreaded portion of the body should preferably extend away from the head by a distance at least approximating the outer diameter of the body 21 plus the greatest thickness of structure in which it is intended to be installed.

As was mentioned above, the step 26 in each strip defines the location of the bend which leads to the tight 180° fold 33 in the properly installed fastener. This bend actually results from buckling of the strip under longitudinal compression, and tends to commence in the weakest part, next to the step which constitutes an irregularity in thickness, as long as that is not too close to either end, in accordance with the physical laws as to buckling of columns.

In the installed condition, the folded parts of the strips, extending from the fold 33 to the cylindrical parts at either end of the fastener, should be perpendicular to the axis for flat support of essentially the entire length of each "petal" against the back of the structure in which the fastener is installed. The two legs on either side of each fold 33 are consequently equal in length. This would suggest that ideally the step 26 should be exactly midway between the back of the structure and the threaded portion of the fastener, or slightly farther from the structure than midway.

Actually, it is found that considerable leeway can be allowed and that satisfactory installations are achieved even though the step is not at the midway point. Although the first bend tends to occur in the thinner portion immediately adjacent to the step 26, progression of the bend, when one of the folding portions is longer than the other, tends to take place in the longer part so as to equalize the lengths. Finally, if one portion approaches a position perpendicular to the axis while the other portion is still at an angle to the perpendicular, outward pressure of the other portion causes the fold to roll until the two portions become equal in length and are pressed against one another, provided that the thicker wall portion is most distant from the structure.

Thus fasteners having a minimum wall thickness of about 10 percent of external diameter, and having a slotted length from the inner face of the head to the threaded portion of 1.6 times the external diameter, may have the step 26 two-thirds of the distance from the inner face of the head to the threaded portion. Such fasteners will install satisfactorily in holes in structures having a thickness ranging from essentially zero up to nearly half the slotted length. Otherwise stated, the location of the step 26 in a fastener placed in a hole in a structure may be such that the distance from the back face of the structure to the step, and the distance from the step to the far end of the slots at the beginning of the threaded portion, may have ratios ranging from about 2:1 to about 1:2 without greatly affecting performance either during installation or during use after installation. Since the length of the entire portion which is to be folded should never be less than about the external diameter of the body 21, these ratios mean that the length of the portion 25 between the step 26 and the location of the first thread 28 may be as little as one-third of the external diameter, with satisfactory results.

If the thickness of the structure results in length ratios greater than 2:1 or less than 1:2, a different length fastener should be chosen, designed for a thickness of structure within its recommended grip range, which is the normal procedure in supply and use of blind fasteners.

Although the embodiments described above have the body 21 divided into four strips 30, almost equally good results are obtained with more or less strips. Division into only two strips results in too great a curvature for best formation of folds, and more than six tends to produce petals which are too narrow for best results.

It is preferred that the fasteners of this invention have a cylindrical outer surface of uniform diameter from the head clear to the other end, so that they will fit ordinary circular holes and develop maximum strength when fastened in place. Various modifications may be made, including changes in shape of the head, or changes in the threaded end.

The fasteners described above are easily manufactured by a variety of known procedures. For example, a rod can be headed and longitudinally slotted or grooved as described above, followed by drilling out the bore to the several diameters described, and by tapping the smallest part of the bore at the end of the body to receive a threaded draw rod or screw. Other manufacturing procedures are possible, including such inexpensive operations as swaging instead of cutting the threads, as described below.

Figure 7:
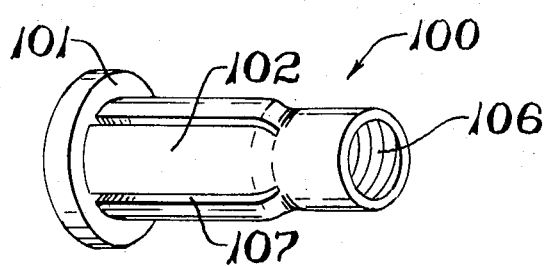
Figure 9:
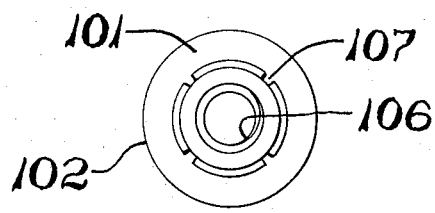
Figure 8:
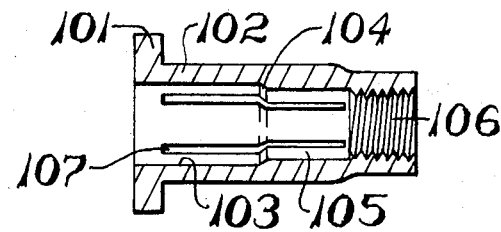

Referring to FIGS. 7, 8, and 9, a fastener 100 can be made by any desired procedure such as flanging or heading a piece of tubing to form a head 101 and body 102. It is then placed on a mandrel having a threaded end, and the corresponding end of the fastener is reduced in diameter by swaging dies to form the metal on the internal surface to a thread 106 corresponding to that of the mandrel. In the same operation four blades are driven into the body to form longitudinal slits 107. The fastener is then unscrewed from the mandrel and is reamed to enlarge the diameter of the part of the bore 103 from the head end to the shallow step 104, beyond which the part of the bore 105 is left at the slightly smaller diameter of the original tubing.

The foregoing description suggests use of the fasteners primarily as nut plates, but if desired, they can be used simply as blind rivets for holding together two sheets of material, either without presence of a screw in the finished assembly or with a snugly fitting screw to increase shear strength. Moreover, it is not essential that the fastener be internally threaded, as it is possible to substitute any other kind of connection of the draw rod (and of the external component if one is to be mounted) such as a bayonet lock, for example.

I claim:

1. A one-piece blind fastener of the type having a head and a tubular body which is integral with the head, is capable of passing through a hole in a structure, and is capable of being reshaped for engagement with the blind surface of the structure by tension on a draw rod insertable and removable through the head, characterized in that:
    1. the bore through the body consists of sections of progressively smaller diameter as they are more distant from the head; and
    2. the portion of the body capable of being reshaped for engagement with the blind surface of the structure and short of the end engageable by the draw rod:
  a. has a length at least about as great as its external diameter,
  b. has a bore of uniform diameter and a wall of uniform thickness for approximately half of its length, and a bore of smaller diameter and a wall of greater thickness for the remainder of its length, establishing an abrupt step in thickness between the two sections, and
  c. is divided lengthwise into a plurality of strips.

2. A fastener as in claim 1, in which the end of the body remote from the head is internally threaded to receive the end of a threaded draw rod.

3. A fastener as in claim 2, in which the body is cylindrical and of essentially uniform external diameter.

4. A fastener as in claim 2, in which the body is cylindrical and of essentially uniform external diameter between the head and the internally threaded end, and of reduced external diameter at the threaded end.

5. A one-piece blind fastener of the type having a head and a tubular body which is integral with the head, is capable of passing through a hole in a structure, and is capable of being reshaped for engagement with the blind surface of the structure by tension on a draw rod insertable and removable through the head, characterized in that:
  1. the body is composed of sections respectively having bores of progressively smaller diameter as they are more distant from the head,
  2. the section of largest bore diameter next to the head has an essentially uniform wall thickness and terminates in a shallow internal step or offset establishing an abrupt reduction in bore diameter,
  3. the section of next smaller bore diameter adjacent to the step has an essentially uniform wall thickness,
  4. a section with a bore of still smaller diameter is internally threaded,
  5. the section of largest diameter and the section of next smaller diameter are divided lengthwise into a plurality of strips continuously across the location of the step, and
    a. the strips have a total length at least about as great as the external diameter of the body and
    b. that part of the strips in the section of smaller bore diameter have a length at least about as great as one-third of the external diameter of the body.

* * * * *